(12) United States Patent
Kettle et al.

(10) Patent No.: US 7,100,744 B2
(45) Date of Patent: Sep. 5, 2006

(54) INTERNAL COMBUSTION ENGINE

(75) Inventors: Richard Kettle, Burnham Slough (GB); Aldo Banchio, Turin (IT)

(73) Assignee: Cummins Engine Company, Ltd., Darlington (GB)

( * ) Notice: Subject to any disclaimer, the term of this patent is extended or adjusted under 35 U.S.C. 154(b) by 467 days.

(21) Appl. No.: 10/603,058

(22) Filed: Jun. 24, 2003

(65) Prior Publication Data
US 2004/0065291 A1 Apr. 8, 2004

(30) Foreign Application Priority Data
Jun. 22, 2002 (GB) ................................. 0214478.0

(51) Int. Cl.
*G01F 23/04* (2006.01)
(52) U.S. Cl. ............... 184/92; 33/722; 33/728
(58) Field of Classification Search ................. 184/1.5, 184/105.1, 88.1, 89, 92; 123/196 R; 33/722, 33/723, 728; 220/86.2, 801, 802, 803; 138/89, 138/962
See application file for complete search history.

(56) References Cited
U.S. PATENT DOCUMENTS

| | | | |
|---|---|---|---|
| 3,474,884 A | 10/1969 | Braun | |
| 4,020,970 A * | 5/1977 | Koscik et al. | 220/293 |
| 4,055,898 A | 11/1977 | Braun et al. | |
| 4,154,105 A * | 5/1979 | Mackley | 374/142 |
| 4,155,166 A * | 5/1979 | Rochow et al. | 33/727 |
| 4,454,717 A * | 6/1984 | Wade et al. | 60/453 |
| 4,480,470 A * | 11/1984 | Tussing | 73/427 |
| 4,761,886 A | 8/1988 | Wilson et al. | |
| 4,948,315 A * | 8/1990 | Limberis | 411/349 |
| 5,022,495 A | 6/1991 | Lavender | |
| 5,325,981 A | 7/1994 | Klomhaus et al. | |
| 5,829,153 A | 11/1998 | Hitchock | |
| 6,565,398 B1 * | 5/2003 | Walczak | 440/88 R |
| 2001/0038212 A1 * | 11/2001 | Ohnishi et al. | 292/241 |

FOREIGN PATENT DOCUMENTS

FR 2 774 170 1/1998
WO WO 01 98639 A 12/2001

* cited by examiner

*Primary Examiner*—Chong H Kim

(57) ABSTRACT

An engine is described having a hole for a dipstick which is closed by a cap from which the dipstick depends. The engine body is formed with an overhanging lip adjacent the mouth of the hole, and the cap comprises a spigot rotatably received in the mouth of the hole and a flange extending radially outwards from the spigot to cover the mouth of the hole. The flange is non-circular so that by rotation of the cap relative to the hole, a radially projecting portion of the edge of the flange may be selectively engaged beneath the overhanging lip to prevent axial displacement of the cap and the dipstick relative to the engine body.

7 Claims, 1 Drawing Sheet

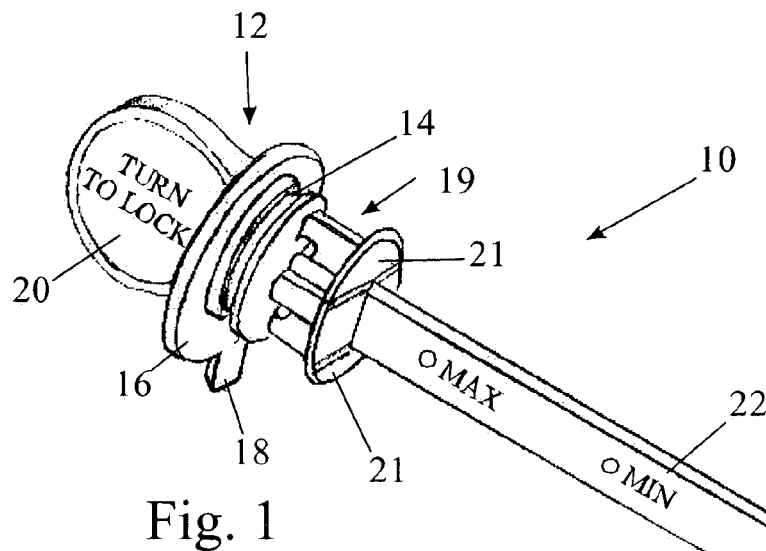
Fig. 1
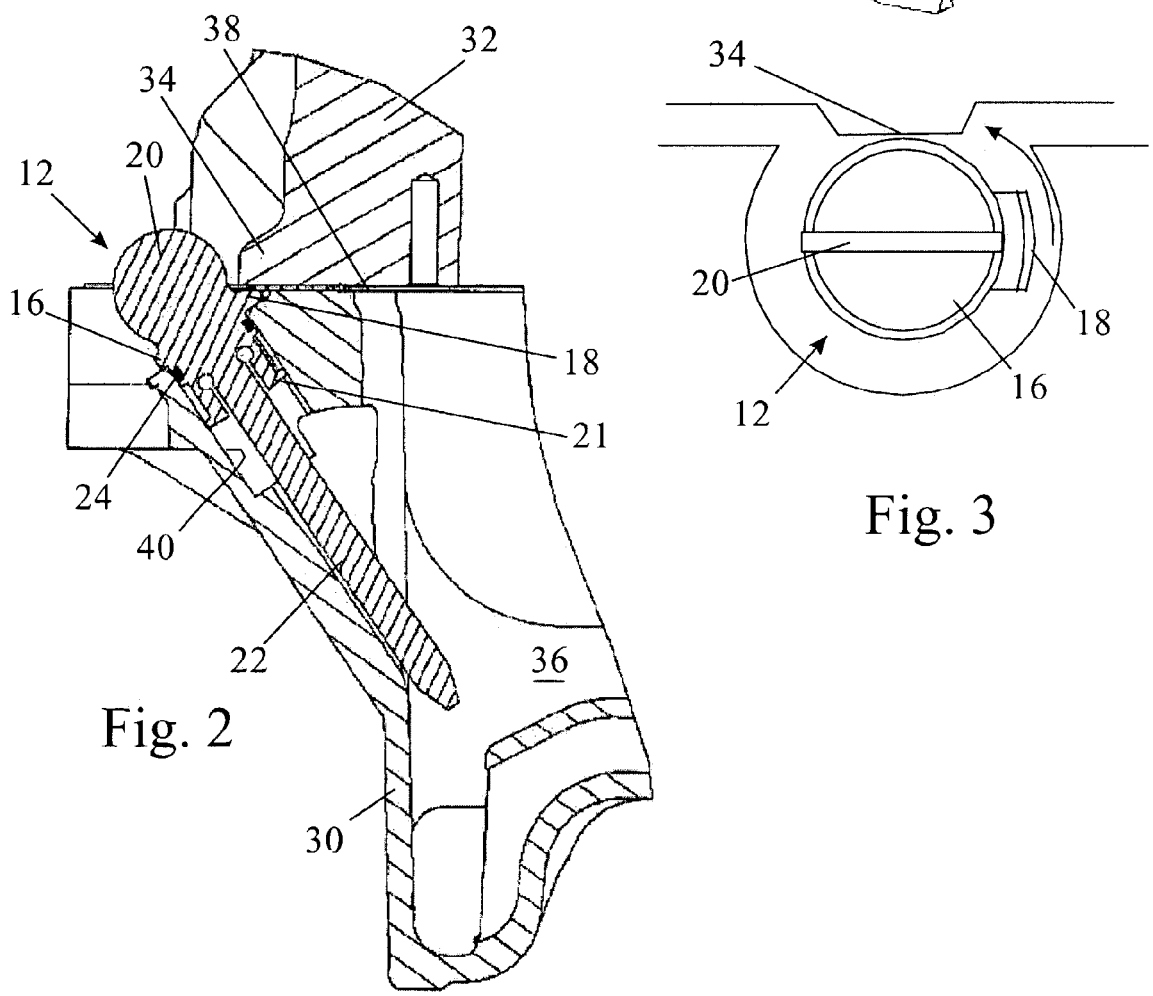
Fig. 2
Fig. 3

INTERNAL COMBUSTION ENGINE

FIELD OF THE INVENTION

The present invention relates to an engine having an oil dipstick and is concerned in particular with the retention of the dipstick on the body of the engine.

BACKGROUND OF THE INVENTION

In agricultural vehicles, it is not practical to add engine oil for lubrication by pouring it into a valve cover at the top of the engine. For this reason, it is known to use the access hole for the dipstick as the filler hole for adding oil to the engine. When the dipstick access hole is made larger to permit oil to be poured into the engine through it, there is an increased tendency for the dipstick to be ejected by the crankcase pressure acting on the cap closing off the filler hole.

An oil filler tube assembly for an internal combustion engine that mitigates this problem is disclosed in U.S. Pat. No. 5,022,495. This assembly includes a tube having a lower end communicating with the crankcase of the engine and an open upper end that is closed by a cap. The under-surface of the cap carries a dipstick which extends downwardly within the tube. The upper end of the tube has a pair of locking elements which are spaced circumferentially with the spaces between the elements being of different circumferential dimension. The cap of the dipstick is constructed in a manner that resembles a conventional engine radiator cap, the cap having a peripheral flange of which the lower edge has a pair of locking lugs of different circumferential dimension. The locking lugs on the cap are constructed and arranged to be received within the spaces between the locking elements of the tube as the cap is inserted on the tube. The locking elements and the locking lugs are provided with mating cam surfaces so that when the cap is rotated one quarter of a turn, a seal on the undersurface of the cap will be forced against the upper end of the tube to tightly seal the cap to the tube.

SUMMARY OF THE INVENTION

The present invention seeks to provide an arrangement that permits the dipstick to be securely held in place without requiring the additional cost and complexity of forming special locking elements on the body of the engine and on the cap of the dipstick.

According to the present invention, there is provided an engine comprising:
- a body that includes a cylinder block and a crankcase,
- a hole formed in the engine body and communicating at its lower end with the crankcase,
- a cap for closing the mouth of the hole, and
- a dipstick depending from the underside of the cap which reaches through the hole into the crankcase in order to enable the oil level within the crankcase to be determined, and characterised in that
- the engine body is formed with an overhanging lip adjacent the mouth of the hole, and
- the cap comprises a spigot rotatably received in the mouth of the hole and a flange extending radially outwards from the spigot to cover the mouth of the hole, the flange being non-circular so that by rotation of the cap relative to the hole, a radially projecting portion of the edge of the flange may be selectively engaged beneath the overhanging lip to prevent axial displacement of the cap and the dipstick relative to the engine body.

In a preferred embodiment of the invention, the engine body is formed of a cylinder block and a separate cast oil sump secured to the cylinder block, the hole for the dipstick is formed in the oil sump casting and the overhanging lip is formed by a part of the cylinder block, or of a gasket disposed between the cylinder block and the oil sump, that projects laterally beyond the oil sump. It will be noted that the face of the cylinder block mating with the oil sump is always machined flat and any gasket used to seal between cylinder block and the oil sump will also have a smooth flat surface. Consequently, when the engine is formed in this manner, the overhanging lip will present a smooth face past which the edge of the flange on the cap can glide easily without requiring an additional machining step.

Advantageously, the spigot is cylindrical and has an outer diameter slightly smaller than that of the hole, an annular groove being formed in the outer surface of the spigot to receive an O-ring for effecting a seal between the cap and the hole. Because the O-ring acts as a radial seal rather than as an axial end seal, the engagement of the flange beneath the lip is not called upon to apply an axial force to effect a seal between the flange on the cap and the engine body. The engagement of the flange serves only to ensure that the cap is not dislodged by the pressure in the crankcase.

When the dipstick is inserted into a hole formed in the oil sump, it does need to be long in order to reach into the oil reservoir in the crankcase. It is therefore practicable to form the dipstick integrally with the cap, the two being preferably formed as a single plastics injection moulded part.

Conveniently, the spigot that is inserted into the mouth of the hole may be formed with radially deformable gripping claws that resiliently and frictionally engage the surface of the hole to retain the spigot within the hole.

Summary of the Drawings

The invention will now be described further, by way of example, with reference to the accompanying drawings, in which:

FIG. 1 is a perspective view of a combined dipstick and oil filler cap,

FIG. 2 is a partial section through the lower end of an engine showing the dipstick of FIG. 1 in situ in an engine oil filler hole, and FIG. 3 is a plan view of the oil filler cap of FIG. 2 during its mounting in the oil filler hole.

DESCRIPTION OF THE PREFERRED EMBODIMENT

The combined dipstick and oil filler cap 10 shown in the drawings comprises a dipstick portion 22 formed integrally with a cap 12, the two being formed as a one-piece injection moulded component. The cap 12 comprises a cylindrical spigot 19 dimensioned to fit in the oil filler hole, designated 40 in FIG. 2. The upper part of the spigot 19 is formed with an annular groove 14 which receives an O-ring 24 that seals against the cylindrical wall of the filler hole 40. The lower end of the spigot 19 has two resilient claws 21 that frictionally grip the filler hole so that the spigot fits snugly in the filler hole 40.

A flange 16 extending radially from the spigot 19 covers the mouth of the hole. The flange 16 is non-circular, being provided with a radially projecting locking finger 18. Additionally, the cap has a projecting disc 20 by means of which the cap can be manually gripped and turned.

The body of the engine is formed with an overhanging lip 34 beneath which the projecting finger 18 can engage in order to retain the cap and dipstick 10 within the oil filler hole 40 against the action of the pressure that builds up within the crankcase of the engine as a result of gases that leak past the engine pistons.

FIG. 2 shows how a suitable overhanging lip can be formed without any additional machining step. In FIG. 2, the oil filler hole 40 is formed as part of a cast sump 30 having an oil reservoir 36. Agricultural vehicles often use structural engines, which are so called because the engine and transmission form part of the vehicle chassis and are relied upon for structural rigidity. In such engines, the oil sump is formed as a substantial casting because it is not only used as an oil reservoir but to stiffen the engine block. The oil sump 30 is bolted on to the underside of the cylinder block 32 with the interposition of a suitable sealing gasket 38. The mating surfaces of the cylinder block 32 and the oil sump 30 are of course machined flat in order to achieve an effective seal.

The cylinder block 32 in FIG. 2 is cast with a projecting lip 34 that overhangs the oil sump 30 in the vicinity of the mouth of the filler hole 40. Instead of forming the cylinder block with a projecting lip, an overhanging lip may be formed by providing a projection on the sealing gasket 38.

The provision of the overhanging lip 34 on the engine body and the projecting finger 18 on the filler cap, permits the cap to be held in place in a very simple manner. To close the filler hole 40, the spigot 19 of the cap 12 is first pushed into the filler hole 40. The claws 21 are pressed towards one another by this action and their resilience enables them to grip the wall of the hole 40 and thereby provide a snug fit. With further insertion, the O-ring 24 enters the filler hole 40 and seals the mouth of the hole. Finally the flange 16 comes to rest against the mouth of the hole.

The cap 12 can then be rotated counter-clockwise from the position shown in FIG. 3, by gripping and turning the disc 20 until the projecting finger 18 engages under the lip 34. The upper surface of the projecting finger 18 can be shaped as a cam that tightens the engagement under the lip 34 as the cap 12 is turned. With the finger 18 so engaged, the oil filler cap and dipstick is firmly held in place and can readily withstand crankcase pressure.

The level of the oil in the crankcase can be checked by first rotating the cap 12 to free the finger 18 from beneath the lip 34 and then pulling the cap and dipstick out of the hole 40. The oil film on the dipstick 22 can then be checked against minimum and maximum markings in the normal manner to ascertain if more oil is needed. If oil is needed, it is poured directly into the sump reservoir 36 through the hole 40, using a funnel or a spout if necessary.

It will be appreciated that various modifications may be made to the described embodiment. For example, in place of a projecting finger 18 the flange may be formed with a flat, or have an eccentric, oval shape.

Having thus described the invention, what is claimed as novel and desired to be secured by Letters Patent of the United States is:

The invention claimed is:

1. An engine comprising:
   a body that includes a cylinder block and a crankcase,
   a hole formed in the engine body and communicating at its lower end with the crankcase,
   a cap for closing the mouth of the hole, and
   a dipstick depending from the underside of the cap which reaches through the hole into the crankcase in order to enable the oil level within the crankcase to be determined, and characterized in that:
   the engine body is formed of a cylinder block and a separate cast oil sump secured to the cylinder block, the hole for the dipstick being formed in the oil sump casting with an overhanging lip adjacent the mouth of the hole formed by a part of the cylinder block that projects laterally beyond the oil sump, and
   the cap comprises a spigot rotatably received in the mouth of the hole and a flange extending radially outwards from the spigot to cover the mouth of the hole, the flange being non-circular so that by rotation of the cap relative to the hole, a radially projecting portion of the edge of the flange may be selectively engaged beneath the overhanging lip to prevent axial displacement of the cap and the dipstick relative to the engine body.

2. An engine according to claim 1, characterized in that:
   the engine body is formed of a cylinder block and a separate cast oil sump secured to the cylinder block,
   the hole for the dipstick is formed in the oil sump casting, and
   the overhanging lip is formed by a part of a gasket disposed between the cylinder block and the oil sump that projects laterally beyond the oil sump.

3. An engine according to claim 2, characterized in that:
   the spigot is cylindrical and has an outer diameter slightly smaller than that of the hole,
   an annular groove is formed in the outer surface of the spigot, and
   an O-ring is fitted within the annular groove to effect a seal between the cap and the hole.

4. An engine according to claim 3, characterized in that the dipstick is formed integrally with the cap.

5. An engine according to claim 4, characterized in that the dipstick and cap are formed as a single plastics injection moulded part.

6. An engine according to claim 5, characterized in that the spigot that is inserted into the mouth of the hole is formed with radially deflectable gripping claws that resiliently and frictionally engage the surface of the hole to retain the spigot within the hole.

7. An engine according to claim 6, characterized in that the upper surface of the radially projecting portion of the edge of the flange comprises a cam that tightens the engagement under the overhanging lip as the cap is turned.

* * * * *